(12) United States Patent
Sager

(10) Patent No.: US 7,635,148 B2
(45) Date of Patent: Dec. 22, 2009

(54) INFLATABLE AIR-BAG

(75) Inventor: Claudia Sager, Stetten (DE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 12/087,386

(22) PCT Filed: Jan. 17, 2006

(86) PCT No.: PCT/SE2006/000060

§ 371 (c)(1),
(2), (4) Date: Jul. 3, 2008

(87) PCT Pub. No.: WO2007/084029

PCT Pub. Date: Jul. 26, 2007

(65) Prior Publication Data

US 2009/0033080 A1    Feb. 5, 2009

(51) Int. Cl.
*B60R 21/30* (2006.01)
(52) U.S. Cl. .................... 280/739; 280/743.1
(58) Field of Classification Search .............. 280/743.1, 280/743.2, 736, 739, 740
See application file for complete search history.

(56) References Cited

U.S. PATENT DOCUMENTS 6,126,196 A * 10/2000 Zimmerman ................ 280/739
6,863,304 B2 * 3/2005 Reiter et al. ................. 280/739
7,059,634 B2 * 6/2006 Bossecker et al. ........... 280/739
7,413,218 B2 * 8/2008 Ekdahl ....................... 280/739
2003/0209895 A1 * 11/2003 Gu .............................. 280/739
2006/0071462 A1 4/2006 Smith et al.

FOREIGN PATENT DOCUMENTS

| DE | 10 2004 034 563 A1 | 2/2006 |
| JP | 8268213 A | 10/1996 |
| JP | 2000052916 A | 2/2000 |
| WO | WO-03/006276 A2 | 1/2003 |

* cited by examiner

*Primary Examiner*—Faye M. Fleming
(74) *Attorney, Agent, or Firm*—Harness, Dickey & Pierce P.L.C.

(57) ABSTRACT

An inflatable air-bag is disclosed which is provided with a controllable vent formed in the fabric of the air-bag. The vent comprises a hole formed in the fabric of the air-bag and a flexible vent tube which extends inwardly of the air-bag from the hole so as to terminate in an open free-end located within the air-bag. The free end of the vent tube is normally tethered within the air-bag so as to maintain the vent in a closed condition but is releasable in response to a signal so as to open the vent. In one arrangement the vent tube is fixed to the inner surface of the air-bag around the hole and is configured so as to have a tapering cross-section which is smaller at the free-end of the tube then at the fixed end of the tube. In another arrangement the vent tube is fixed to the inner surface of the air-bag fabric around the vent hole by stitching which runs around the periphery of the hole and which is located within the vent tube.

30 Claims, 4 Drawing Sheets

INFLATABLE AIR-BAG

CROSS-REFERENCE TO RELATED APPLICATIONS

This application is a National Stage of International Application No. PCT/SE2006/000060, filed Jan. 17, 2006. The entire disclosure of the above application is incorporated herein by reference.

FIELD

The present invention relates to an inflatable air-bag, and more particularly relates to an inflatable air-bag intended to provide protection for an occupant of a vehicle in the event that an accident should occur.

BACKGROUND

This section provides background information related to the present disclosure which is not necessarily prior art.

It is widely known to provide an inflatable air-bag which, in the event of an accident situation arising, becomes inflated to provide a protective cushion in front of or adjacent to an occupant of a motor vehicle. Whilst it might be thought that a substantially air-tight air-bag would be preferred for this purpose to ensure that the air-bag remains inflated for a maximum period of time, it has actually been found through practice that it is preferable to include at least one air-vent in an air-bag, since otherwise an occupant would simply rebound from the air-bag when hitting it. An air-bag provided with a vent hole has been found to provide a more appropriate "cushioning effect", even though the resulting air-bag will, of course, become deflated quite rapidly following initial deployment. However, air-bags are typically deployed, by an appropriate sensor arrangement, at such a time that the air-bag is inflated when an occupant of a seat, to be protected by the air-bag actually moves into contact with the air-bag.

It has been found that ideally the internal pressure of an air-bag or the "cushioning" effect provided by the air-bag should be adjusted depending upon certain perimeters such as, for example, the size of a seat occupant, the position of the seat occupant and whether or not the seat occupant is wearing a seat belt. A seat occupant who is not wearing a seat belt may require a rather "stiffer" air-bag than an occupant who is wearing a seat belt. Similarly, a larger occupant has been found to require a "stiffer" air-bag than a smaller occupant. However, an occupant sitting close an air-bag should be provided with a relative "soft" air-bag if at all possible.

Attempts have been made to provide air-bags with these characteristics by sensing the relevant parameter and by adjusting the amount of gas injected into the air-bag by means of the gas generator. Such arrangements are, however, relatively complex and thus expensive. It has therefore been proposed previously to provide an improved air-bag arrangement having a controllable vent so as to allow venting of the air-bag in dependence upon relevant parameters.

WO2003/006276A3 discloses an arrangement of this general type where an air-bag is provided with a controllable vent formed in the fabric of the air-bag. The vent is normally maintained in a closed position by a fabric element retained by a clamp and the clamp is releasable in response to a signal from a sensor such as a crash-sensor. One particular embodiment disclosed in this document provides a re-entrant tube which extends into the interior of the air-bag from a vent hole, with the free end of the tube defining the controllable vent. The free end of the tube is retained by the clamp and released upon receipt of an appropriate signal from the crash-sensor.

However, it is now considered desirable to provide an improved air-bag ventilation arrangement which is suitable for easier manufacture and quicker ventilation in the event of an accident situation.

It is therefore an object of the present invention to provide an improved inflatable air-bag.

SUMMARY

One aspect of the present invention provides an inflatable air-bag, the air-bag being provided with a controllable vent formed in the fabric of the air-bag, the vent comprising a hole formed in the fabric of the air-bag, and a flexible vent-tube which extends inwardly of the air-bag from said hole to terminate in an open free end located within the air-bag, the free end of the vent-tube normally being tethered within the air-bag so as to maintain the vent in a closed condition, but being releasable in response to a signal from a sensor so as to open the vent, characterised in that said vent-tube is fixed to the inner surface of the air-bag fabric around said hole and is configured so as to have a tapering cross-section which is smaller at the free end of the tube than at the fixed end of the tube.

Preferably at least a region of said tube between its fixed and free ends is of substantially frusto-conical form.

Advantageously said tube is formed from a strip of fabric, a substantially central region of which is fixed to the inner surface of said air-bag around said hole, and which is folded away from said air-bag fabric so as to define two layers of substantially superimposed fabric, said superimposed layers being interconnected so as to define the vent-tube.

According to another aspect of the present invention, there is provided an inflatable air-bag, the air-bag being provided with a controllable vent formed in the fabric of the air-bag, the vent comprising a hole formed in the fabric of the air-bag, and a flexible vent-tube which extends inwardly of the air-bag from said hole to terminate in a free end located within the air-bag, the free end of the vent-tube normally being tethered within the air-bag so as to maintain the vent in a closed condition, but being releasable in response to a signal from a sensor so as to open the vent, characterised in that said vent-tube is fixed to the inner surface of the air-bag fabric around said hole by stitching which runs around the periphery of the hole and which is located within the tube.

Preferably said tube is formed from a strip of fabric, a substantially central region of which is fixed to the inner surface of said air-bag by a line of stitching around said hole, and which is folded away from said air-bag fabric so as to define two layers of substantially superimposed fabric, said superimposed layers being interconnected along aligned edges so as to define the vent-tube.

Advantageously said superimposed layers are sewn together so as to define the vent-tube.

Conveniently said hole is substantially elliptical.

Preferably said strip of fabric is folded about a notional fold-line which is substantially coincident with the major axis of the elliptical hole.

Advantageously each of said layers defined by folding said strip are of substantially identical trapezoidal form and are interconnected along their legs.

Conveniently said layers each take the form of an isosceles trapezoid.

Preferably each of said layers defined by folding said strip are of substantially identical quadrilateral form having no parallel sides, each layer having one relatively long edge and one relatively short edge, the two long edges being aligned and connected to one another and the two short edges being aligned and connected to one another in such a manner as to provide the vent-tube with an open free end which lies at an acute angle with respect to the vent hole.

Advantageously the air-bag is further provided with an inflator to direct inflating gas into the interior of the air-bag, and wherein said vent-tube is orientated with respect to said inflator such that said short edges are closer to the inflator than said long edges.

Conveniently the air-bag is further provided with an inflator to direct inflating gas into the interior of the air-bag, and wherein said vent-tube is orientated with respect to said inflator such that said long edges are closer to the inflator than said short edges.

Preferably said vent-tube is initially tethered by a strap so as to adopt a position in which the vent-tube is folded across the vent hole, the strap being releasable in response to said signal from the sensor so as to allow the vent-tube to unfold at least partially through the hole.

DRAWINGS

DETAILED DESCRIPTION

So that the invention may be more readily understood, and so that further features thereof may be appreciated, embodiments of the invention will now be described, by way of example, with reference to the accompanying drawings.

Figure 1:
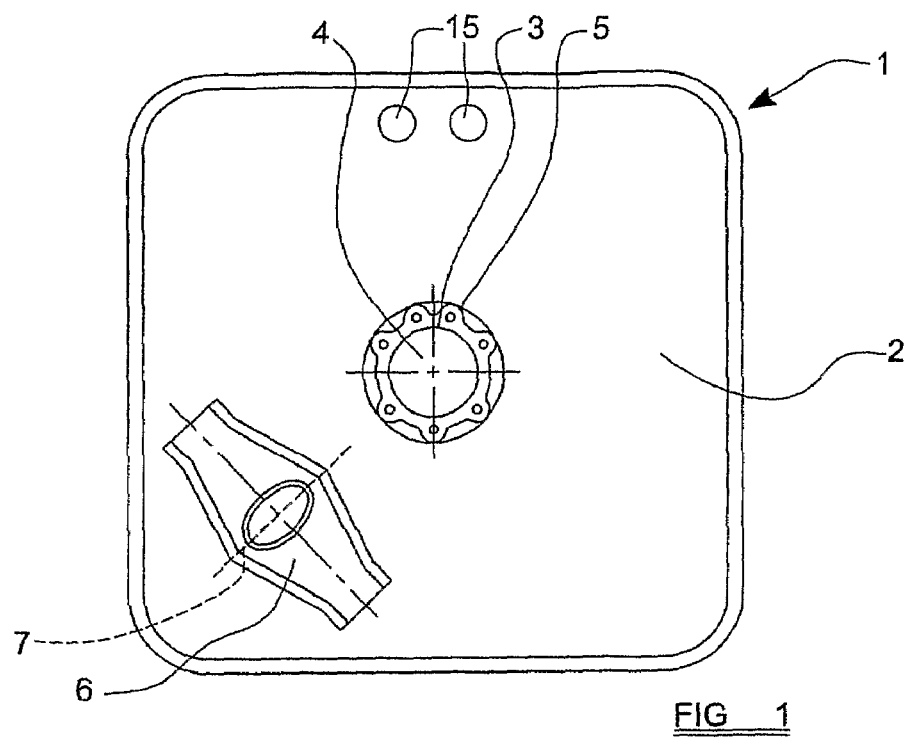
FIG. 1 is a schematic view showing the inner surface of a sheet of fabric intended to form part of an inflatable air-bag, the sheet of fabric having secured to it a smaller strip of fabric intended to form a vent-tube.

Referring in more detail to FIG. 1, there is illustrated part of an inflatable air-bag 1 during an initial stage of manufacture. The air-bag 1 comprises a lower sheet of fabric material 2 which, as can be seen from the drawing, has a generally square configuration, but with somewhat rounded corners. The upper (inner) surface of the fabric material 2 is preferably coated with a protective layer in order to protect the weave of the fabric material from the hot and aggressive flow of inflating gas used to inflate the air-bag.

Figure 8:
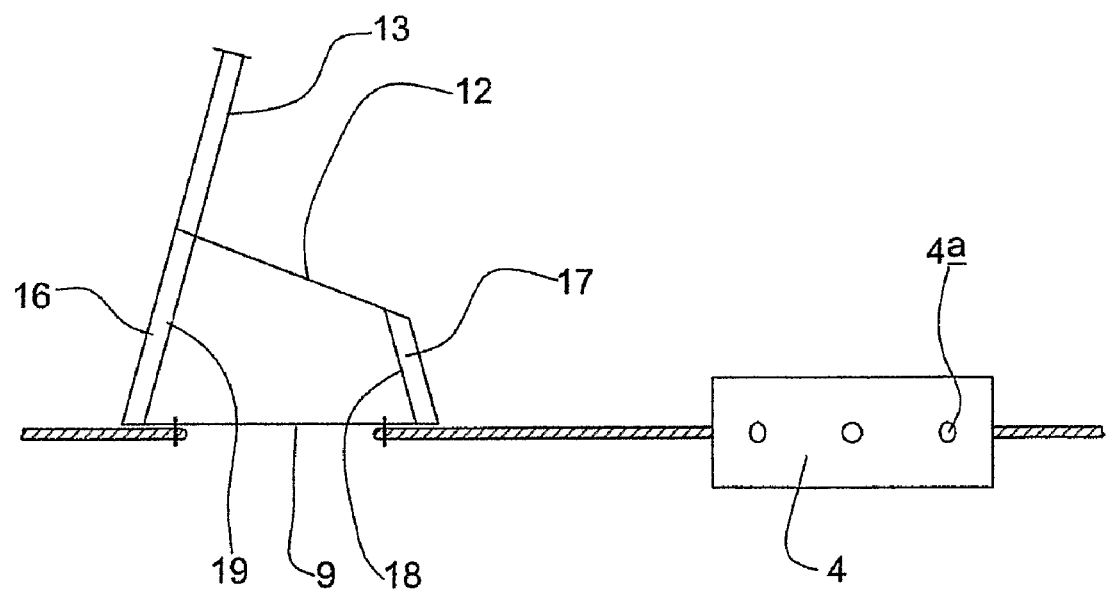
FIG. 8 is a view corresponding generally to that of FIG. 3, but illustrating the vent-tube configuration of FIG. 7.

Located substantially centrally within the layer of air-bag fabric 2, there is formed a gas inlet aperture 3 which is sized and configured to fit over part of an inflator 4 such a gas-generator of a type generally known per se. The gas generator carries an outwardly directed peripheral mounting flange 5 to which a reinforced region of the air-bag fabric 2 around the gas inlet aperture 3 is fixed. The portion of the inflator 4 which projects through the gas inlet aperture 3 defines a plurality of gas outlet apertures (not shown in FIG. 1, but identified at 4a in FIGS. 6 and 8) around its periphery through which a radially outwardly directed flow of inflating gas is directed upon actuation of the inflator 4.

At a position spaced from the centrally located inflator 4, there is provided an elongate strip of fabric 6 which is substantially symmetrical about a transverse axis of symmetry 7, each half of the strip 6 tapering so as to narrow with increasing distance away from the axis of symmetry 7. The strip of fabric 6 is shown in FIG. 1 positioned on the innermost surface of the air-bag fabric 2 so as to adopt a position in which its transverse axis of symmetry 7 lies substantially coincident with a notional line interconnecting one corner of the air-bag fabric 2 and the centre of the gas inlet aperture 3.

Figure 2:
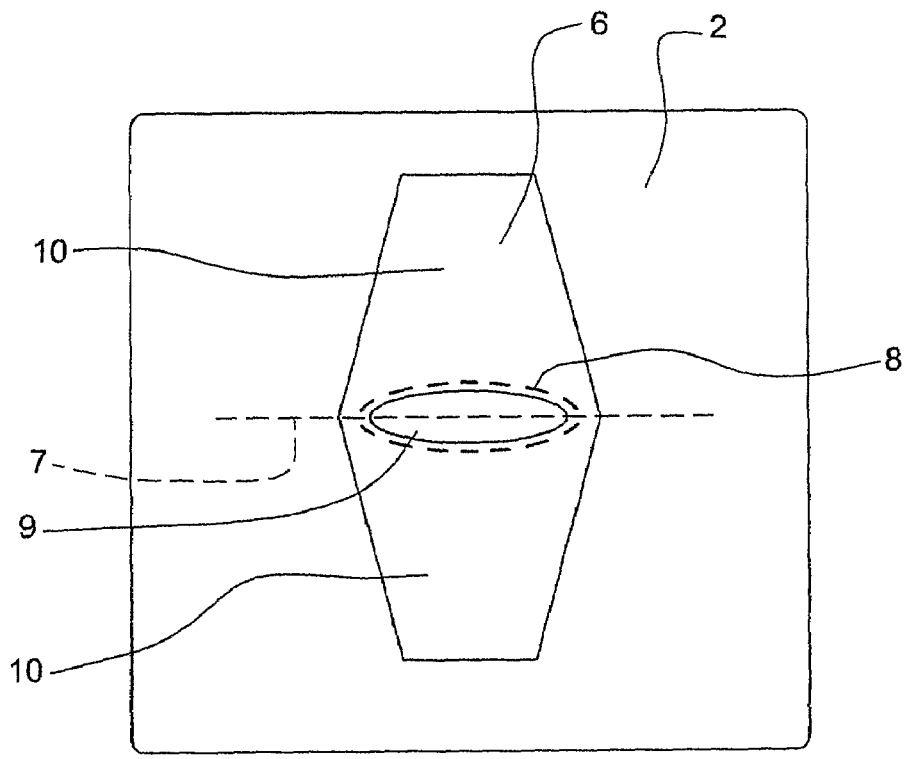
FIG. 2 is a an enlarged view of the strip of fabric secured to the main part of the air-bag fabric.

As illustrated in more detail in FIG. 2, the strip of fabric 6 is secured to the inner surface of the air-bag fabric 2, in the orientation illustrated in FIG. 1, by a substantially elliptical line of stitching 8, the major axis of the thus-defined ellipse being coincident with the transverse axis of symmetry 7 of the fabric strip 6. When the strip of fabric 6 has been secured to the inner surface of the air-bag fabric layer 2 in this way, a substantially elliptical vent hole 9 is cut through both the fabric of the strip 6 and the layer 2, the elliptical vent hole 9 thus lying within the elliptical line of stitching 8 such that the elliptical line of stitching 8 runs around the periphery of the vent hole 9. However, it should be appreciated that in an alternative method of manufacture of the air-bag, substantially identical elliptical vent holes could be cut separately through the layer of fabric 2 and the strip of fabric 6, whereupon the strip of fabric 6 could then be positioned against the layer 2 such that the two elliptical holes become aligned, whereupon the two layers of fabric could then be sewn together via the peripheral line of stitching 8.

It should also be appreciated that in alternative embodiments, the aspect ratio of the elliptical vent hole 9 could be varied from that illustrated in the appended drawings, or the vent hole and the associated peripheral line of stitching could even take the form of a circle.

It should therefore be appreciated that, following the sewing together of the main layer of air-bag fabric 2 and the strip of fabric 6 in the manner described above, the strip of fabric 6 ends up fixed to the inner surface of the air-bag fabric in a substantially central region of the strip. After this step has been completed, the strip of fabric 6 effectively defines two substantially identical flaps 10, each located on an opposite side of the vent hole 9. Each flap 10 of the embodiment illustrated in FIG. 2 is substantially identical in form and takes the shape of a substantially isosceles trapezium, the longer base of the trapezium lying across the vent hole 9, and the shorter base of the trapezium being spaced therefrom.

The two flaps of material 10 can then be folded upwardly, away from the inner surface of the main layer of fabric 2, about a notional fold line defined by the axis of symmetry 7, so as to become superimposed upon one another and such that the legs of each trapezium shape become aligned. This is the configuration illustrated from the side in FIG. 3.

When the two flaps 10 have been superimposed in this manner, the two edges of one flap defined by the "legs" of its trapezoidal form are interconnected with respective aligned edges of the other flap, most preferably by way of respective lines of stitching 11. It is important to appreciate, however, that the ends of each flap 10, as defined by the short "bases" of the respective trapezoidal forms, are not interconnected. In this manner, the sewn-together flaps define a vent-tube which extends inwardly of the air-bag away from the inner surface of the main fabric layer 2, around the vent hole 9 so as to terminate in an open end 12 at a position remote from the vent hole 9. As can be seen from FIG. 3, due to the generally trapezoidal form of each flap 10 defined by the fabric strip 6, the resulting inwardly directed vent-tube has at least a region between its two ends which is of substantially frusto-conical form and which hence has a tapering cross-section which is smaller at its free end then at the end fixed to the fabric layer 2.

Figure 3:
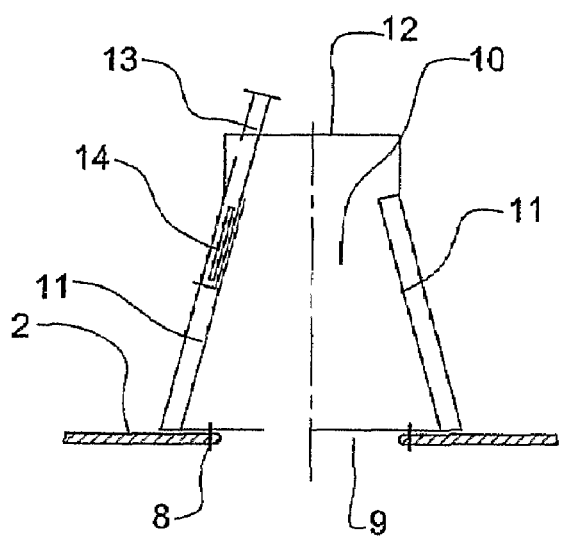
FIG. 3 is a view from one side, looking along the plane of the air-bag fabric, showing the additional strip of fabric having been folded during a subsequent stage of manufacture so as to form a tapering vent-tube.

Another important feature to recognise from FIG. 3 is that, because the strip of fabric 6 defining the vent-tube in the manner disclosed above is fixed to the fabric layer 2 by way of the line of stitching 8 before the two flaps 10 of the strip 6 are folded up and sewn together, the peripheral seam defined by the line of stitching 8 effectively becomes located within the resulting vent-tube. This is important because it ensures that the line of stitching, which can be vulnerable to hot and aggressive gas flow, is protected by the fabric of the tube from the gas flow produced by the inflator 4 in the event of inflation. This helps to prevent damage to the seam defined by the line of stitching 8.

Figure 4A:
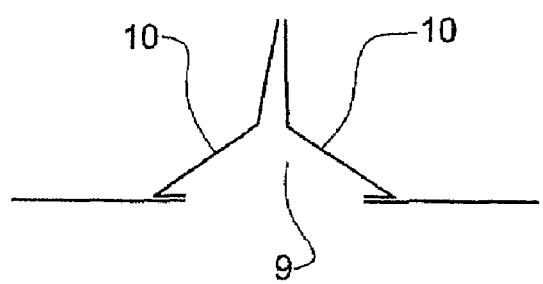
FIG. 4 shows, at (a) a side view of the vent-tube of the present invention in a first position; at (b) the vent-tube adopting an initial, folded over configuration in which it lies over a vent hole; at (c) the vent-tube during the an initial stage of deployment upon inflation of the air-bag; and at (d) the vent-tube at a final stage of deployment.
Figure 4B:
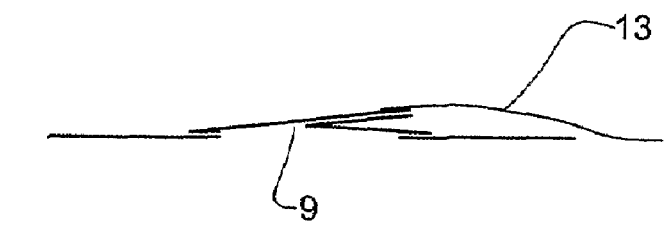

FIG. 4a is another side view, orthogonal to that of FIG. 3, generally along the minor axis of the elliptical vent hole 9, after the two flaps 10 have been interconnected in the manner disclosed above. FIG. 4a illustrates the vent-tube in its generally un-deformed natural condition. However, during a subsequent stage of fabrication of the air-bag of the present invention, the vent-tube is folded from its "natural" condition illustrated in FIG. 4a so as to adopt the configuration illustrated in FIG. 4b in which the vent-tube is folded across the vent hole 9. The vent-tube is initially held in this folded configuration, by a releasable strap 13 which is secured at one end to one side of the vent-tube and which is releasably securable at its other end (not shown) by way of a releasable actuator provided as part of the air-bag module. The end of the strap remote from the vent-tube can thus be released upon receipt of an appropriate signal from a sensor (configured, for example, to measure seat-occupant weight or position).

A preferred form of attachment between the strap 13 and the fabric defining the vent-tube is illustrated in FIG. 3, where it can be seen that the strap 13 is secured to the fabric defining the flaps 10 by a line of stitching 14 lying substantially adjacent to the main line of stitching 11 serving to interconnect the side edges of the two flaps 10. In an alternative arrangement, it is envisaged that one end of the strap 13 could be secured to the vent-tube by being inserted between the two flaps of fabric 10 as they are folded up and superimposed, so that a single line of stitching 11 can serve to interconnect both the flaps 10 and, therebetween, the strap 13.

Of course, it should be appreciated that following fabrication of the above-described vent-tube in the manner set out above, the air-bag 1 is completed by superimposing an upper layer of fabric over the lower layer of fabric 2 and interconnecting the two layers around their periphery so as to define the final air-bag with the vent-tube installed around the vent hole 9 and folded over across the vent hole so as to lie inside the envelope of the air-bag.

During "ordinary" inflation of the air-bag, when the air-bag is intended to have its "ordinary" degree of stiffness, the strap 13 is not released by the actuator. The air-bag then becomes inflated in the ordinary way, whereupon the substantially open vent holes 15 provided through the fabric layer 2 (see FIG. 1) provide a path for gas to exit from the interior of the air-bag. Thus when a seat occupant comes into contact with the air-bag, the pressure of gas within the air-bag will, of course, initially rise, but the gas will subsequently be forced out of the vent holes 15 as the occupant impacts with the air-bag, so that the air-bag provides the desired "cushioning" effect.

Figure 4C:
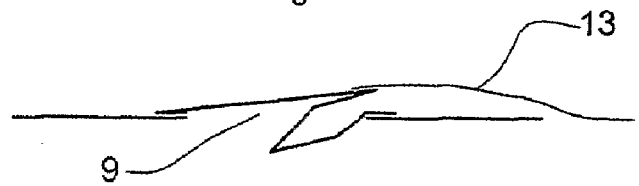

During "ordinary" inflation of the air-bag as described above, gas pressure will be exerted on the folded-over vent-tube and so part of the vent-tube will be urged through the vent hole 9 as illustrated schematically in FIG. 4c. However, providing the strap 13 is retained in position by the actuator arrangement, then the vent-tube will be prevented from passing completely through the aperture 9 and so will maintain the vent hole 9 closed to the flow of gas.

Figure 4D:
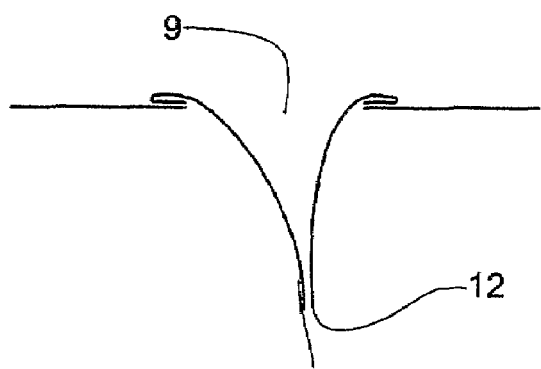

However, should the sensor determine that a "soft" air-bag is required, then when the air-bag is at least partially inflated, the actuator will be released, thereby freeing the strap 13. The pressure of gas within the air-bag will then cause the inwardly directed vent-tube to be forced to extend out of the air-bag through the vent hole 9 as illustrated generally in FIG. 4(d). Because the folded over vent-tube is initially forced partially out through the hole 9, whilst maintaining a generally sealing configuration, unraveling of the vent-tube completely through the vent hole 9 as illustrated in FIG. 4(d) occurs very quickly upon release of the strap 13.

Upon complete unfolding of the vent-tube through the vent aperture 9, the open free end 12 of the vent-tube thus constitutes further, open, vent hole, permitting the exit of a greater quantity of gas from the air-bag than would be the case if the tube had been retained in its initial position folded across the vent hole 9.

It has been found that the tapering configuration of the vent-tube construction described above offers significant advantages in terms of deployment speed, since it allows easier unfolding of the vent-tube and allows the vent-tube to pass more easily through the vent hole 9.

Figure 5:
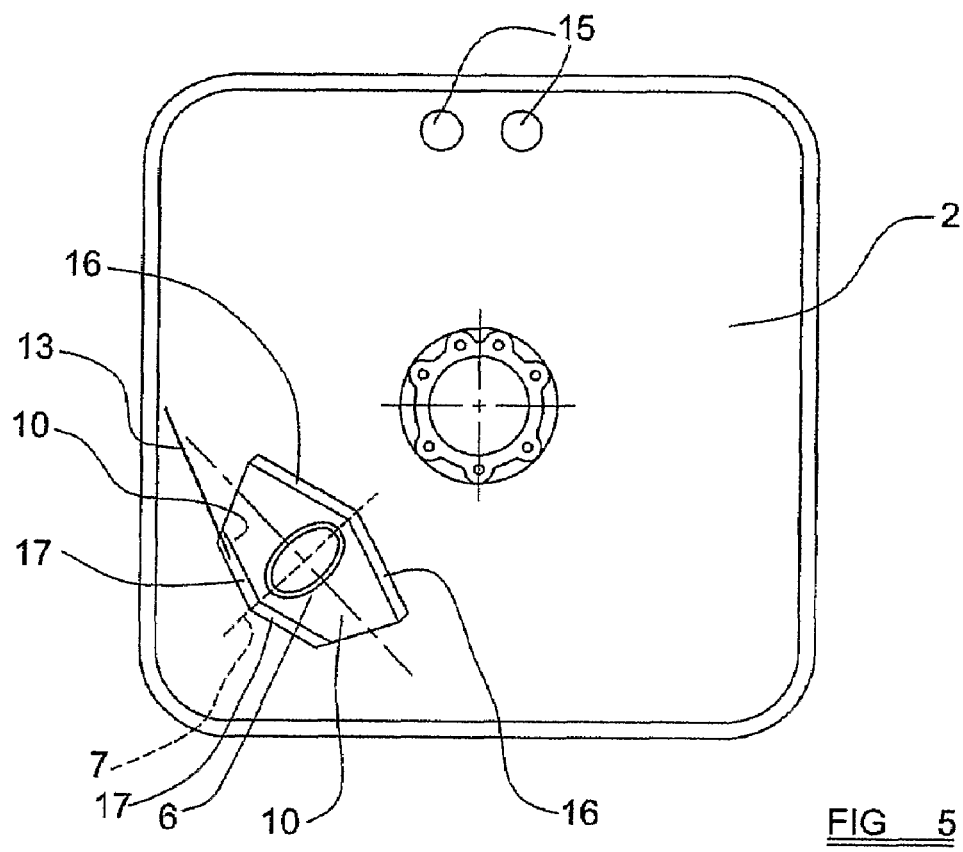
FIG. 5 is a view corresponding generally to that of FIG. 1, but illustrating an alternative embodiment in which the vent-tube is formed from a strip of fabric having a different configuration to that of FIG. 1.

Turning now to consider FIG. 5, an alternative form of the fabric strip 6 is illustrated which is used to provide a vent-tube having a slightly different form to that described above, so as to provide a varied venting characteristic. In this arrangement, the fabric strip 6 is again substantially symmetrical about the line of symmetry 7 and is again secured to the fabric layer 2 in substantially the same manner is described above with respect to FIGS. 1 and 2. However, in this arrangement the shape of the fabric strip 6 is such that the two flaps 10 defined on either side of the axis symmetry 7 each have a form which is truncated slightly from those illustrated in FIGS. 1 to 2. It will be seen that instead of taking a purely trapezoidal form, the two flaps 10 each take the form of a substantially identical quadrilateral shape having no parallel sides. By comparing FIGS. 2 and 5, it will be seen that the alternative configuration illustrated FIG. 5 can be achieved by cutting the end region of each flap 10 so as to shorten one of its two side edges. Thus, each flap 10 has one relatively long side edge 16 and one relatively short side edge 17.

Figure 6:
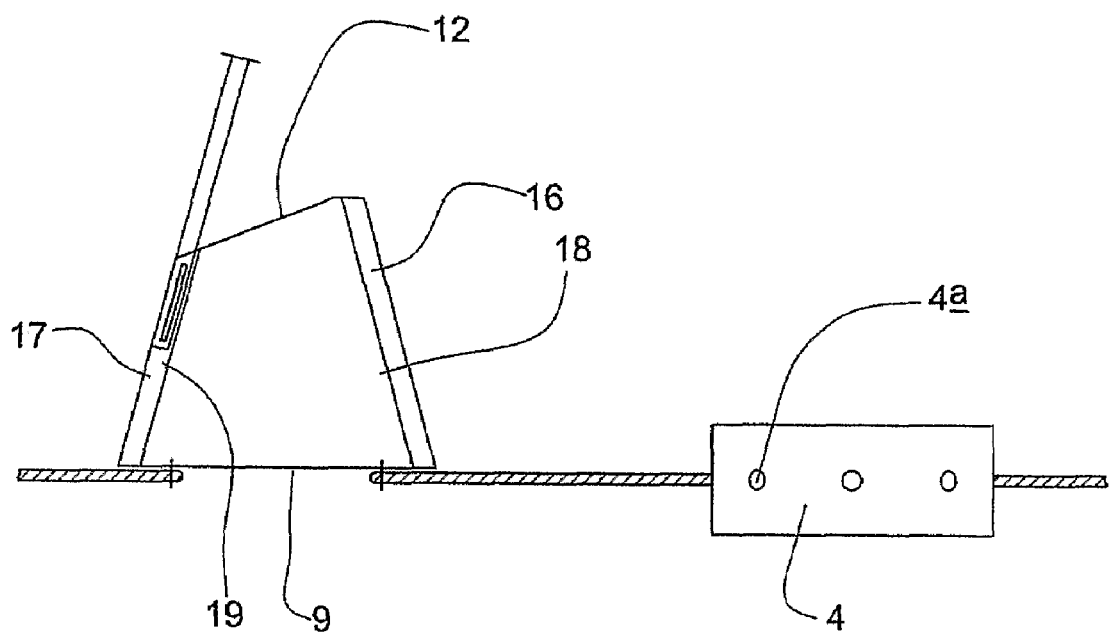
FIG. 6 is a view corresponding generally to that of FIG. 3, but illustrating the vent-tube configuration of FIG. 5.

In other respects, the vent-tube of the embodiment illustrated in FIGS. 5 and 6 is formed in exactly the same manner as that described above with respect to FIGS. 1 to 3. The two resulting flaps 10 are each folded up, about the notional fold line defined by the axis of symmetry 7, and away from the fabric layer 2 so as to become superimposed and such that the two short edges 17 become aligned with one another and the two long edges 16 become aligned with one another. The two long edges 16 are then interconnected with one another by a line of stitching 18, and the two short edges 17 are secured to one another by a line of stitching 19. As can be seen from FIG. 6, this arrangement therefore provides a vent-tube in which the open end 12 is angled away from the inflator 4. This is achieved by attaching the strip of fabric 6 which ultimately defines the vent-tube in such a manner that the vent-tube becomes orientated with respect to the inflator such that the interconnected long edges 16 are located closer to the inflator than the short edges 17.

An arrangement of the type illustrated above with respect to FIGS. 5 and 6 helps to ensure that no, or at least very little, flow of gas from the inflator 4 enters the open end of the vent-tube immediately upon release of the strap. As can be seen from FIG. 6, at the instant the strap 13 is released, and prior to the vent-tube passing through the vent hole 9, the open end 12 of the vent-tube is angled away from the inflator 4, thereby preventing substantial flow of gas from the inflator into the open end of the tube until it passes through the vent hole 9 and reverses.

Figure 7:
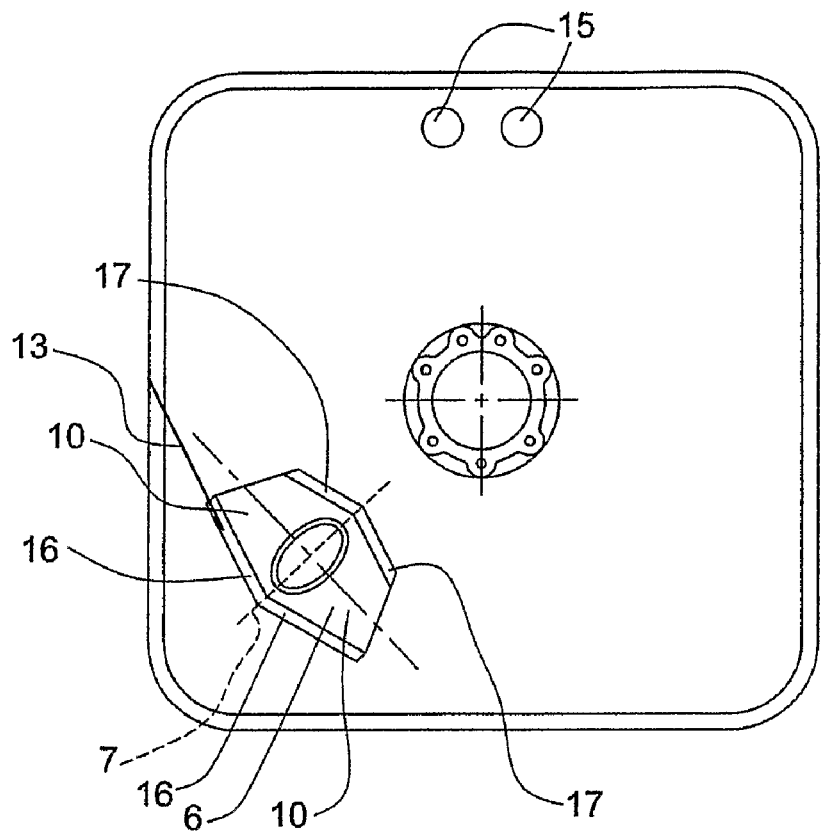
FIG. 7 is a view corresponding generally to that of FIG. 5, but illustrating a further alternative configuration for the vent-tube fabric.

Turning now to consider FIG. 7 a further alternative form of the fabric strip 6 is illustrated which is used to provide a vent-tube having another slightly different form. In this arrangement, the fabric strip 6 is substantially identical to that of the arrangement of FIGS. 5 and 6, but in this arrangement the fabric strip is attached to the layer of air-bag fabric 2 in a position which is rotated 180° C. relative to that illustrated in FIG. 5. This results in the vent-tube having an open end 12 which is angled towards the inflator 4 rather than away from the inflator 4 as was the case in the arrangement of FIGS. 5 and 6. This angling of the open end of the vent-tube 12 is most clearly illustrated in FIG. 8. As will therefore be appreciated, in this arrangement, the strip of fabric 6 is secured to the air-bag fabric 2 in such a manner that the vent-tube becomes orientated with respect to the inflator such that the interconnecting short edges 16 are located closer to the inflator than the long edges 16.

An arrangement of the type described above with regard to FIGS. 7 and 8 is advantageous in arrangements in which a degree of initial venting through the vent hole 9 is desired immediately upon release of the strap 13, but prior to complete reversal of the tube so as to pass out through the vent hole 9. As can be seen from FIG. 8, the vent-tube is configured such that its free end 12 is angled towards the inflator 4. The effect of this configuration is that some of the inflating gas produced by the inflator can easily enter the free end 12 of the vent-tube immediately upon release of the strap 13, but prior to substantial reversal of the tube through the vent hole 9.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. An inflatable air-bag comprising:
   a vent formed in a fabric of the air-bag, the vent including a hole; and
   a flexible vent-tube extending into the air-bag from the hole and including an open free end located within the air-bag, the free end of the vent-tube normally being tethered within the air-bag so as to maintain the vent in a closed condition and further being releasable in response to a signal from a sensor so as to open the vent, the vent-tube having a fixed end fixed to an inner surface of the air-bag fabric around the hole and having a tapering cross-section smaller at the free end of the tube than at the fixed end of the tube.

2. The inflatable air-bag according to claim 1, wherein at least a region of the tube between the fixed end and the free end is substantially frusto-conical.

3. The inflatable air-bag according to claim 1, wherein the tube is formed from a strip of fabric, a substantially central region of the strip fixed to an inner surface of the air-bag around the hole, and the strip folded away from the air-bag fabric so as to define two layers of substantially superimposed fabric, the superimposed layers being interconnected so as to define the vent-tube.

4. The inflatable air-bag according to claim 3, wherein the superimposed layers are sewn together so as to define the vent-tube.

5. The inflatable air-bag according to claim 1, wherein the hole is substantially elliptical.

6. The inflatable air-bag according to claim 1, wherein the hole is substantially elliptical and wherein the strip of fabric is folded about an imaginary fold-line which is substantially coincident with a major axis of the elliptical hole.

7. The inflatable air-bag according to claim 3, wherein each of the layers defined by folding the strip are of substantially identical trapezoidal form and are interconnected along their legs.

8. The inflatable air-bag according to claim 7, wherein the strip of fabric includes first and seconds ends that each have a shape of an isosceles trapezoid.

9. The inflatable air-bag according to claim 3, wherein the strip of fabric includes first and second ends, each end having a substantially identical quadrilateral form having no parallel sides, each layer having one relatively long edge and one relatively short edge, the two long edges being aligned and connected to one another and the two short edges being aligned and connected to one another in such a manner as to provide the vent-tube with an open free end which lies at an acute angle with respect to the vent hole.

10. The inflatable air-bag according to claim 9, further provided with an inflator to direct inflating gas into the interior of the air-bag, and wherein the vent-tube is orientated with respect to the inflator such that the short edges are closer to the inflator than the long edges.

11. The inflatable air-bag according to claim 9, further provided with an inflator to direct inflating gas into the interior of the air-bag, and wherein the vent-tube is orientated with respect to the inflator such that the long edges are closer to the inflator than the short edges.

12. The inflatable air-bag according to claim 1, wherein the vent-tube is initially tethered by a strap so as to adopt a position in which the vent-tube is folded across the vent hole, the strap being releasable in response to the signal from the sensor so as to allow the vent-tube to unfold at least partially through the hole.

13. An inflatable air-bag comprising:
    a fabric;
    a controllable vent formed in the fabric of the air-bag, the vent comprising a hole formed in the fabric of the air-bag; and
    a flexible vent-tube extending inwardly of the air-bag from the hole to terminate in a free end located within the air-bag, the free end of the vent-tube normally being tethered within the air-bag so as to maintain the vent in a closed condition and further being releasable in response to a signal from a sensor so as to open the vent, the vent-tube being fixed to the inner surface of the air-bag fabric around the hole by stitching which extends around a periphery of the hole and which is located within the tube.

14. The inflatable air-bag according to claim 13, wherein the tube is formed from a strip of fabric, a substantially central region of which is fixed to the inner surface of said air-bag by a line of stitching around the hole, and which is folded away from the air-bag fabric so as to define two layers of substantially superimposed fabric, the superimposed layers being interconnected along aligned edges so as to define the vent-tube.

15. The inflatable air-bag according to claim 14, wherein the superimposed layers are sewn together so as to define the vent-tube.

16. The inflatable air-bag according to claim 13, wherein the hole is substantially elliptical.

17. The inflatable air-bag according to claim 13, wherein the hole is substantially elliptical and wherein the strip of fabric is folded about an imaginary fold-line which is substantially coincident with a major axis of the elliptical hole.

18. The inflatable air-bag according to claim 14, wherein the strip of fabric includes first and second ends that are of substantially identical trapezoidal form and are interconnected along their legs.

19. The inflatable air-bag according to claim 18, wherein the first and seconds ends each take the form of an isosceles trapezoid.

20. The inflatable air-bag according to claim 14, wherein each of the layers defined by folding the strip are of substantially identical quadrilateral form having no parallel sides, each layer having one relatively long edge and one relatively short edge, the two long edges being aligned and connected to one another and the two short edges being aligned and connected to one another in such a manner as to provide the vent-tube with an open free end which lies at an acute angle with respect to the vent hole.

21. The inflatable air-bag according to claim 20, further provided with an inflator to direct inflating gas into the interior of the air-bag, and wherein the vent-tube is orientated with respect to the inflator such that the short edges are closer to the inflator than the long edges.

22. The inflatable air-bag according to claim 20, further provided with an inflator to direct inflating gas into the interior of the air-bag, and wherein the vent-tube is orientated with respect to the inflator such that the long edges are closer to the inflator than the short edges.

23. The inflatable air-bag according to claim 14, wherein the vent-tube is initially tethered by a strap so as to adopt a position in which the vent-tube is folded across the vent hole, the strap being releasable in response to the signal from the sensor so as to allow the vent-tube to unfold at least partially through the hole.

24. The inflatable air-bag according to claim 1, wherein the strip of fabric includes a first end and a second end, the first and second ends respectively defining first and second radially opposite sides of the tube.

25. The inflatable air-bag according to claim 1, wherein the tube is secured to the inner surface of the air-bag fabric at an interior of the tube.

26. The inflatable air-bag according to claim 13, wherein the strip of fabric includes a first end and a second end, the first and second ends respectively defining first and second radially opposite sides of the tube.

27. The inflatable air-bag according to claim 13, wherein the tube is secured to the inner surface of the air-bag fabric at an interior of the tube.

28. An inflatable restraint comprising:
a fabric air-bag defining a vent hole; and
a strip of fabric having an opening aligned with the vent hole, the strip of fabric secured to an inner side of the fabric air-bag circumferentially about the vent hole, the strip of fabric further including first and second ends extending in opposite directions relative to the vent hole, the first and second ends secured to one another to respectively define first and second radially opposite sides of a vent-tube.

29. The inflatable restrict according to claim 28, wherein the vent-tube has a tapering cross-section.

30. The inflatable restrict according to claim 28, wherein at least a portion of the tube has a frusto-conical shape.

* * * * *